Patented June 16, 1953

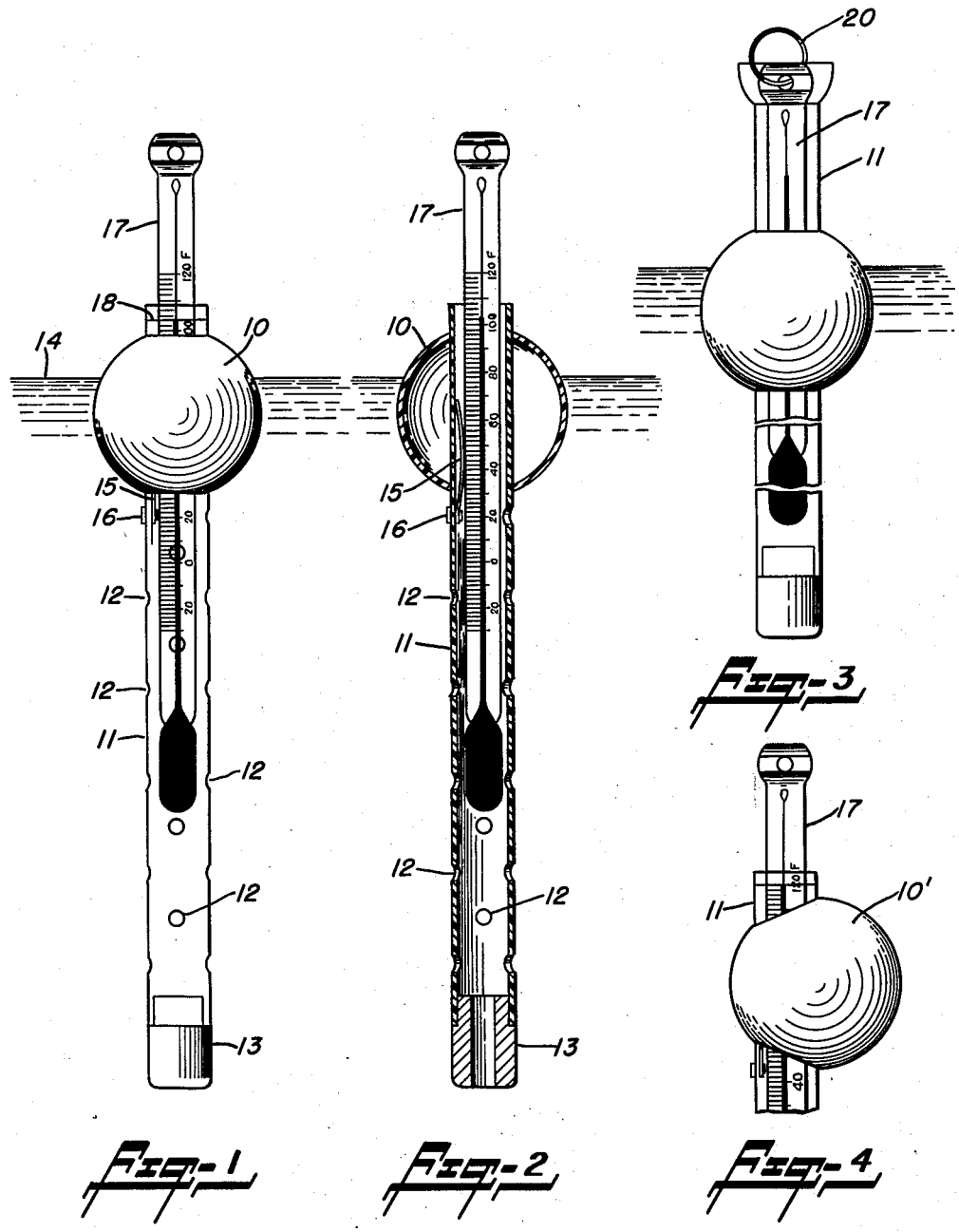

2,641,930

UNITED STATES PATENT OFFICE 2,641,930

FLOATABLE THERMOMETER

Earl R. Kebbon, Chatham, N. J., assignor to Weston Electrical Instrument Corporation, Newark, N. J., a corporation of New Jersey Application September 19, 1951, Serial No. 247,287

6 Claims. (Cl. 73—353)

This invention relates to thermometers and more particularly to a thermometer adapted to float in a fluid, the temperature of which is to be measured.

An object of this invention is the provision of a floatable thermometer including means for adjusting the extent to which the thermometer extends above the fluid and a fixed reference index to which a selected graduation of the thermometer can be set in order to facilitate a reading of the departure of the fluid temperature from a predetermined normal value.

An object of this invention is the provision of a simple, economic float assembly for a glass thermometer which assembly will float upright even though a considerable portion of the thermometer extends above the surface of the fluid whose temperature is being measured.

An object of this invention is the provision of a floatable thermometer comprising a float, a transparent tube carried by the float, a weight at one end of the tube, a normal reference mark at the other end of the tube, a thermometer disposed within the tube and friction means for retaining the thermometer in a selected, fixed position relative to the tube.

These and other objects and advantages will be apparent from the following description when taken with the accompanying drawings illustrating several embodiments of the invention. The drawings are for purposes of illustration and are not to be construed as defining the scope or limits of the invention, reference for the latter purpose being had to the appended claims.

In the drawings wherein like reference characters denote like parts in the several views:

Figure 1 is a front elevation of a thermometer made in accordance with one embodiment of this invention;

Figure 2 is a central sectional view taken through the float and transparent tube of the device shown in Figure 1;

Figure 3 is an elevation view showing a modification of the upper end of the device; and Figure 4 is a fragmentary elevation view showing another embodiment of the invention designed to float the thermometer at an angle relative to the surface of the fluid being measured.

Referring now to Figures 1 and 2, my device comprises a float 10 made of any suitable material such as, for example, a conventional Pingpong ball, having axially alined holes therein to accommodate a transparent tube 11 made, preferably, of a plastic. The transparent tube is provided with a plurality of transverse holes 12 to permit the flow of fluid into the tube when the device is in use. The lower end of the tube carries a hollow, metallic member 13 having a reduced diameter section that may be forcefitted inside the tube, as shown, said member providing the necessary weight to float the device in an upright position in the fluid. By way of illustration, the surface of the fluid is indicated by the numeral 14 in Figure 1. Disposed within the tube is a curved leaf spring 15 having one end secured to the tube as by the rivet 16. Normally, a major portion of the leaf spring extends toward the tube axis. Thus, when the glass thermometer 17 is inserted into the tube the spring provides sufficient frictional restraint to retain the thermometer in the desired position.

The glass thermometer may be of conventional construction although I prefer to add a black or red dye to the expansible fluid for better readability of the spirit column through the upper portion of the plastic tube 11. It will be apparent the thermometer is slidable to any desired position within the transparent tube. The weight 13 is made sufficiently heavy so that a major portion of the thermometer can extend upwardly out of the plastic tube and yet remain in an upright position.

In many applications wherein a thermometer is floated in a fluid the thermometer serves as a quick means to indicate deviations of fluid temperature from a predetermined normal, or operating, value. To facilitate reading of the device for this purpose I provide a fixed, readily-visible index mark 18 around the upper end of the transparent tube. Thus, if the normal operating range of the fluid is 100 degrees F., the operator merely slides the thermometer into the tube until the 100 degree scale graduation of the thermometer is alined with the index mark. In such arrangement even a quick view of Figure 1 will show the temperature deviation of the fluid. As the operator will know the temperature equivalent of each scale graduation on the particular thermometer being used, he will know, at once, the actual temperature of the fluid without reference to the specific temperature values marked on the thermometer. It may here be pointed out that in an application wherein the fluid has a normal operating range between, say, 90 and 100° F., two reference marks can be provided on the transparent tube. Such marks would be spaced apart a distance corresponding exactly to that of the 90 and 100° marks on the particular glass thermometer to be employed. By alining the thermometer graduations with the two reference marks the operator merely observes the position of the thermometer spirit column. As long as the top of the spirit column falls between the two reference marks the temperature of the fluid falls within the proper operating range.

Figure 3 illustrates another embodiment of the invention wherein the upper end of the transparent tube 11 is flattened to conform, generally, to the flattened top section of the thermometer 17. A pair of radially-alined holes are provided in the flattened portion of the tube, such holes also being alined with the hole in a thermometer top, and a suitable ring 20 is inserted through the holes, as shown. In this particular construction the position of the thermometer within the tube is fixed and the float 10 is attached to the tube at a point such that the portion of the thermometer extending above the float carries the range of temperature values suitable for the particular application. A metal ring 20 may be attached, as shown, to serve as a convenient means for hanging the thermometer when not in use. As an alternate construction, when the transparent tube 11 is made of a relatively thin-walled plastic material the upper section need not be flattened as a separate operation. The thermometer is merely forced into such tube which will deform to accommodate the flattened top section of the thermometer whereby the thermometer will be held firmly in position within the tube.

Figure 4 illustrates a modification of the device shown in Figure 1. Here, however, the float 10' is mounted eccentrically relative to the tube 11 whereby the axes of the tube and thermometer will be disposed at an angle relative to the surface of the fluid when the device is in use.

Having now described my invention certain variations and modifications of the individual parts and their cooperating assembly will be apparent to those skilled in the art. Such variations and modifications can be made without departing from the spirit and scope of the invention as set forth in the following claims.

I claim:

1. A floatable thermometer comprising a spherical float, a transparent tube passing through the float, a weight secured to one end of the tube, a plurality of holes in the wall of the tube, and a glass thermometer disposed substantially axially within the tube and carrying temperature markings.

2. The invention as recited in claim 1 and including a leaf spring having an end secured to the tube wall, said spring having a central section frictionally engaging the surface of the thermometer.

3. The invention as recited in claim 2 wherein the tube passes through the float along a chord of the sphere.

4. The invention as recited in claim 1 and including a fixed reference mark on the other end of the said tube.

5. The invention as recited in claim 1 wherein the thermometer has a flattened top section having a hole therein, the other end of the said tube is flattened and provided with alined holes, in combination with a ring passing through the holes in the tube and the hole in the thermometer top.

6. The invention as recited in claim 1, wherein the thermometer has a flattened top section, the transparent tube is made of a deformable plastic and the entire thermometer is disposed within the tube.

EARL R. KEBBON.

References Cited in the file of this patent

UNITED STATES PATENTS

| Number | Name | Date |
|---|---|---|
| 660,094 | Hicks | Jan. 15, 1901 |
| 907,107 | Courtois | Dec. 15, 1908 |
| 2,312,106 | Longacre | Feb. 23, 1943 |

FOREIGN PATENTS

| Number | Country | Date |
|---|---|---|
| 599,789 | France | Oct. 26, 1925 |